US009895997B2

(12) United States Patent
Takizawa et al.

(10) Patent No.: US 9,895,997 B2
(45) Date of Patent: Feb. 20, 2018

(54) DRIVE SYSTEM, TRANSPORTER, ELECTRICAL DEVICE, AND CONTROL METHOD FOR DRIVE SYSTEM

(71) Applicant: HONDA MOTOR CO., LTD., Tokyo (JP)

(72) Inventors: Daijiro Takizawa, Wako (JP); Masahiro Shimada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/264,604

(22) Filed: Sep. 14, 2016

(65) Prior Publication Data

US 2017/0088009 A1    Mar. 30, 2017

(30) Foreign Application Priority Data

Sep. 29, 2015   (JP) ................. 2015-192204

(51) Int. Cl.
*B60K 11/02* (2006.01)
*B60L 11/18* (2006.01)
(Continued)

(52) U.S. Cl.
CPC ............ *B60L 11/1874* (2013.01); *B60K 1/04* (2013.01); *B60L 7/10* (2013.01); *B60L 11/1824* (2013.01);
(Continued)

(58) Field of Classification Search
USPC .......... 318/139, 471, 494, 500, 504; 701/22; 320/137, 150; 180/7.1, 54.1, 65.1, 65.29,
(Continued)

(56) References Cited

U.S. PATENT DOCUMENTS 5,141,826 A * 8/1992 Bohm ................. H01M 10/653
429/120
6,422,027 B1 * 7/2002 Coates, Jr. .......... H01M 10/625
62/185
(Continued)

FOREIGN PATENT DOCUMENTS

JP    2002-187435    7/2002
JP    2009-126452    6/2009
(Continued)

OTHER PUBLICATIONS

Japanese Office Action for corresponding JP Application No. 2015-192204, dated Jun. 6, 2017 (w/ English machine translation).

*Primary Examiner* — Bentsu Ro
(74) *Attorney, Agent, or Firm* — Mori & Ward, LLP (57) ABSTRACT

A drive system includes a first energy storage, a second energy storage, a driver, and a controller. The first energy storage is charged and discharged. A first amount of heat is generated by charging and discharging the first energy storage. The second energy storage is charged and discharged. The second amount of heat is generated by charging and discharging the second energy storage and is smaller than the first amount of heat. The driver generates driving power to move an electrically powered vehicle with electric power supplied from at least one of the first energy storage and the second energy storage. The controller controls temperature of the first energy storage and temperature of the second energy storage with a coolant flowing inside the electrically powered vehicle. The first energy storage is cooled by the coolant before the second energy storage is cooled by the coolant.

28 Claims, 6 Drawing Sheets

(51) Int. Cl.
*H01M 10/65* (2014.01)
*B60K 1/04* (2006.01)
*B60L 7/10* (2006.01)
*B60K 1/00* (2006.01)

(52) U.S. Cl.
CPC ........... *B60L 11/1862* (2013.01); *B60K 11/02* (2013.01); *B60K 2001/001* (2013.01); *B60K 2001/005* (2013.01)

(58) Field of Classification Search
USPC .......... 180/65.31, 68.5; 310/52, 53; 429/120
See application file for complete search history.

(56) References Cited

U.S. PATENT DOCUMENTS

| | | | | |
|---|---|---|---|---|
| 7,353,900 B2* | 4/2008 | Abe | ........................ | B60R 16/04 180/65.31 |
| 8,227,101 B2* | 7/2012 | Takagi | ................ | H01M 10/425 320/150 |
| 2011/0262794 A1* | 10/2011 | Yoon | ................... | H01M 10/486 429/120 |
| 2014/0012447 A1* | 1/2014 | Gao | ..................... | B60L 11/1874 701/22 |
| 2014/0062228 A1* | 3/2014 | Carpenter | ................ | H02K 9/24 310/53 |
| 2014/0338376 A1* | 11/2014 | Carpenter | ............... | B60L 1/003 62/115 |

FOREIGN PATENT DOCUMENTS

| | | |
|---|---|---|
| JP | 2014-079152 | 5/2014 |
| JP | 2014-143817 | 8/2014 |
| JP | 2014-196078 | 10/2014 |
| JP | 2014-212698 | 11/2014 |

* cited by examiner

| | HIGH-CAPACITY BATTERY ES-E | HIGH-POWER BATTERY ES-P |
|---|---|---|
| <<DIFFERENCE IN PROPERTIES>> | | |
| VOLTAGE | HIGH | LOW |
| ENERGY WEIGHT DENSITY (W/kg) | HIGH | LOW |
| POWER WEIGHT DENSITY (Wh/kg) | LOW | HIGH |
| CHARGING RECEPTIVITY | POOR | EXCELLENT |
| INTERNAL RESISTANCE (IMPEDANCE) | HIGH | LOW |
| <<CHARGER>> | | |
| CHARGING BY NORMAL CHARGER | ACCEPTABLE | ACCEPTABLE |
| CHARGING BY HIGH-SPEED CHARGER | MAIN | SUB |
| <<USAGE>> | | |
| SOC TARGET VALUE | LOW | INTERMEDIATE VALUE |
| REGENERATED POWER RECEPTIVITY | CHARGE WITH PORTION THAT CANNOT CHARGE HIGH-POWER BATTERY ES-P | PREFERENTIAL CHARGING |
| HEAT GENERATION AMOUNT | LARGE | SMALL |

DRIVE SYSTEM, TRANSPORTER, ELECTRICAL DEVICE, AND CONTROL METHOD FOR DRIVE SYSTEM

CROSS-REFERENCE TO RELATED APPLICATIONS

The present application claims priority under 35 U.S.C. § 119 to Japanese Patent Application No. 2015-192204, filed Sep. 29, 2015, entitled "Drive System, Transporter, Electrical Device, and Control Method for Drive System." The contents of this application are incorporated herein by reference in their entirety.

BACKGROUND

1. Field

The present disclosure relates to a drive system, a transporter, and an electrical device, and a control method for the drive system.

2. Description of the Related Art

Japanese Unexamined Patent Application Publication No. 2009-126452 describes a vehicle provided with a fuel cell power source system. The vehicle includes: a fuel cell; an energy storage unit formed from a secondary battery and a capacitor connected to the fuel cell; an electrical mechanism that is connected to the fuel cell and to an output section of the energy storage unit, and that is a motive power source for the vehicle; and a power drive unit (PDU) disposed between the output section and the electrical mechanism. Configuration components of the power source system including the fuel cell, the energy storage unit, and the PDU, are disposed so as to be cooled by a coolant flowing inside the vehicle, in ascending order of the maximum usage temperature and the amount of produced heat. The energy storage unit, the fuel cell, and the PDU each have different maximum usage temperatures. For example, the maximum usage temperature of the energy storage unit is 60° C., the maximum usage temperature of the fuel cell is 90° C., and the maximum usage temperature of the PDU is 120° C. Moreover, an amount of heat produced by the energy storage unit is the smallest and an amount of heat produced by the PDU is the largest among those produced by the fuel cell, the energy storage unit, and the PDU. Therefore, the energy storage unit, the fuel cell, and the PDU are disposed so as to be cooled in this sequence by the coolant flowing inside the vehicle described in Japanese Unexamined Patent Application Publication No. 2009-126452.

Japanese Unexamined Patent Application Publication No. 2014-79152 describes an electrically powered vehicle provided with plural energy storages. The electrically powered vehicle described in Japanese Unexamined Patent Application Publication No. 2014-79152 is provided with a cooling system that uses a liquid coolant to cool batteries used relatively frequently, and uses a gas coolant to cool batteries used relatively infrequently.

SUMMARY

According to a first aspect of the present invention, a drive system includes a first energy storage, a second energy storage, a drive section, and a controller. The second energy storage produces a smaller amount of heat due to charging and discharging than the first energy storage. The drive section is driven by power obtained from at least one of the first energy storage and the second energy storage so as to output motive power for an electrically powered vehicle. The controller controls temperatures of the first energy storage and the second energy storage using a coolant flowing inside the electrically powered vehicle. The first energy storage and the second energy storage are disposed inside the electrically powered vehicle such that the first energy storage and the second energy storage are cooled by the coolant in this sequence.

According to a second aspect of the present invention, an electrical device includes a first electrical section of an electrically powered vehicle, a second electrical section of the electrically powered vehicle, and a controller. The second electrical section produces a smaller amount of heat than the first electrical section. The controller controls temperatures of the first electrical section and the second electrical section using a coolant flowing inside the electrically powered vehicle. The first electrical section and the second electrical section are disposed inside the electrically powered vehicle such that the first electrical section and the second electrical section are cooled by the coolant in this sequence.

According to a third aspect of the present invention, a control method for a drive system including a first energy storage, a second energy storage that produces a smaller amount of heat due to charging and discharging than the first energy storage, a drive section that is driven by power obtained from at least one of the first energy storage and the second energy storage so as to output motive power for an electrically powered vehicle, a controller that controls temperatures of the first energy storage and the second energy storage using a coolant flowing inside the electrically powered vehicle, a temperature regulator that regulates a temperature of the coolant, and a supply amount regulator that regulates a supplied amount of the coolant, the first energy storage and the second energy storage being disposed inside the electrically powered vehicle such that the first energy storage and the second energy storage are cooled by the coolant in this sequence, the control method includes in cases in which a primary temperature that is a temperature of the coolant prior to cooling the first energy storage is higher than at least one of the temperature of the first energy storage and the temperature of the second energy storage, the controller driving the temperature regulator to lower the temperature of the coolant, and then determining whether or not to increase the supplied amount of coolant using the supply amount regulator based on a secondary temperature that is a temperature of the coolant after having cooled the first energy storage but prior to cooling the second energy storage, and based on the temperature of the second energy storage.

According to a fourth aspect of the present invention, a drive system includes a first energy storage, a second energy storage, a driver, and a controller. The first energy storage is charged and discharged. A first amount of heat is generated by charging and discharging the first energy storage. The second energy storage is charged and discharged. The second amount of heat is generated by charging and discharging the second energy storage and is smaller than the first amount of heat. The driver generates driving power to move an electrically powered vehicle with electric power supplied from at least one of the first energy storage and the second energy storage. The controller controls temperature of the first energy storage and temperature of the second energy storage with a coolant flowing inside the electrically powered vehicle. The first energy storage and the second energy storage are disposed inside the electrically powered vehicle such that the first energy storage is cooled by the coolant before the second energy storage is cooled by the coolant.

According to a fifth aspect of the present invention, an electrical device includes a first electrical component of an electrically powered vehicle, a second electrical component of the electrically powered vehicle, and a controller. A first amount of heat is generated from the first electrical component. A second amount of heat is generated from the second electrical component and is smaller than the first amount of heat. The controller controls temperature of the first electrical component and temperature of the second electrical component with a coolant flowing inside the electrically powered vehicle. The first electrical component and the second electrical component are disposed inside the electrically powered vehicle such that the first electrical component is cooled by the coolant before the second electrical component is cooled by the coolant.

According to a sixth aspect of the present invention, a control method for a drive system, includes controlling temperature of a first energy storage and temperature of a second energy storage with a coolant flowing inside an electrically powered vehicle. A first amount of heat is generated by charging and discharging the first energy storage. The second amount of heat is generated by charging and discharging the second energy storage and is smaller than the first amount of heat. The first energy storage and the second energy storage are disposed inside the electrically powered vehicle such that the first energy storage is cooled by the coolant before the second energy storage is cooled by the coolant. The method includes determining whether or not a primary temperature of a coolant prior to cooling a first energy storage is higher than at least one temperature of the first energy storage and temperature of the second energy storage. The method includes lowing temperature of the coolant in a case where the primary temperature is higher than the at least one temperature. The method includes determining whether or not to increase a supply amount of coolant based on the temperature of the second energy storage and a secondary temperature of the coolant that has cooled the first energy storage and has not cooled the second energy.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Explanation follows regarding an embodiment of the present disclosure, with reference to the drawings.

Figure 1:
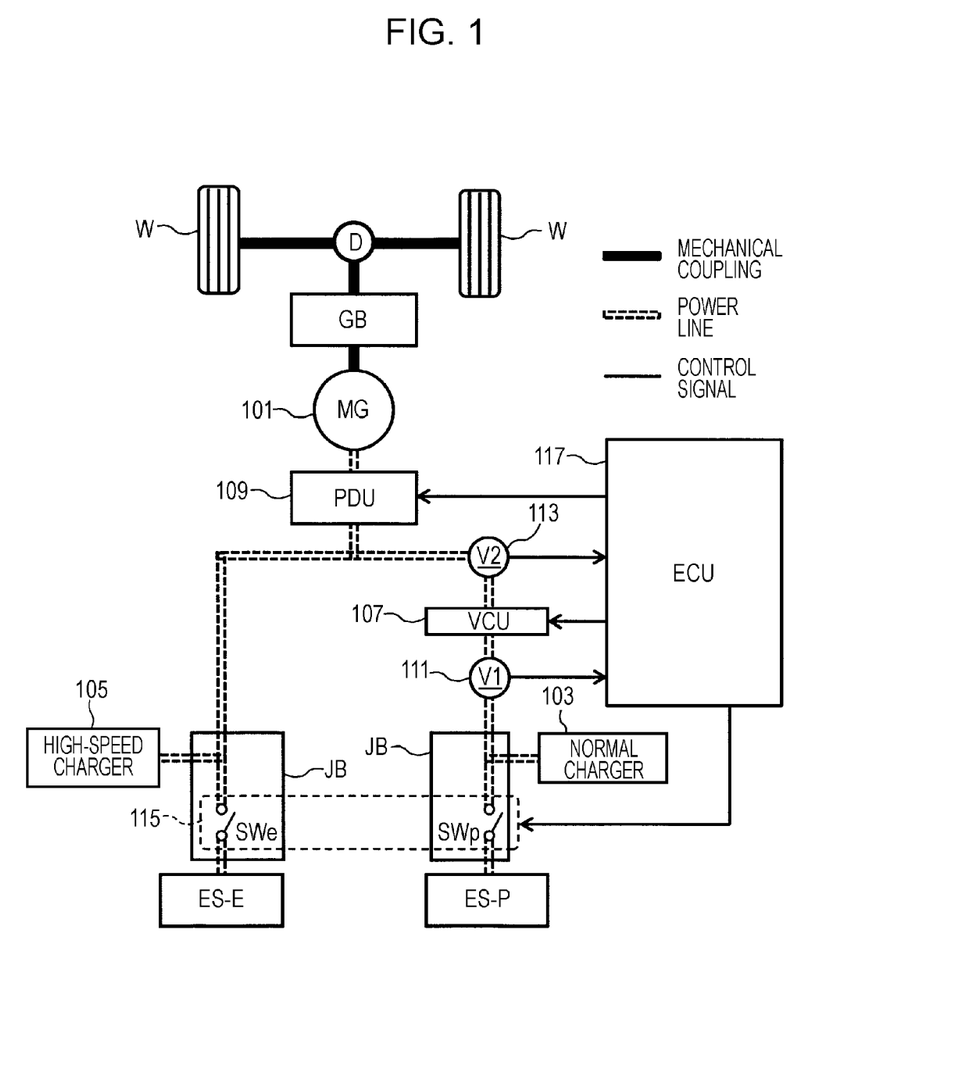
FIG. 1 is a block diagram illustrating an internal configuration of an electrically powered vehicle of a first embodiment.

FIG. 1 is a block diagram illustrating an internal configuration of an electrically powered vehicle. The single motor electrically powered vehicle illustrated in FIG. 1 includes a motor/generator (MG) 101, a high-capacity battery ES-E, a high-power battery ES-P, a normal charger 103, a high-speed charger 105, a voltage control unit (VCU) 107, a power drive unit (PDU) 109, a V1 sensor 111, a V2 sensor 113, a switch group 115, and an electronic control unit (ECU) 117. Note that in FIG. 1, mechanical couplings are indicated by bold continuous lines, power lines are indicated by dashed double lines, and control signals are indicated by narrow continuous lines.

The motor/generator 101 is driven by power obtained from at least one out of the high-capacity battery ES-E or the high-power battery ES-P, and generates a motive power to cause the electrically powered vehicle to travel. Torque generated by the motor/generator 101 is transmitted to drive wheels W through a gear box GB including a variable transmission or a fixed transmission, and through a differential gear D. The motor/generator 101 operates as a power generator during deceleration of the electrically powered vehicle, and outputs braking power of the electrically powered vehicle. Regenerated power generated by the motor/generator 101 operating as a power generator is accumulated in at least one out of the high-capacity battery ES-E or the high-power battery ES-P.

The high-capacity battery ES-E includes plural energy storage cells, such as lithium ion batteries or nickel hydride batteries, and supplies high voltage power to the motor/generator 101. The high-power battery ES-P also includes plural energy storage cells, such as lithium ion batteries or nickel hydride batteries, and supplies high voltage power to the motor/generator 101 through the VCU 107. The high-power battery ES-P is connected through the VCU 107 to the PDU 109, in parallel with the high-capacity battery ES-E. The voltage of a high-power battery ES-P is generally lower than the voltage of a high-capacity battery ES-E. Thus, the power of the high-power battery ES-P is stepped up by the VCU 107 to the same level as the voltage of the high-capacity battery ES-E, and then supplied to the motor/generator 101 through the PDU 109.

The high-capacity battery ES-E and the high-power battery ES-P are not limited to secondary batteries, such as the nickel hydride batteries or the lithium ion batteries mentioned above. For example, although they store a small amount of energy, a condenser or a capacitor capable of charging or discharging a large quantity of power over a short period of time may be employed as the high-power battery ES-P.

The normal charger 103 is connected in parallel to the high-power battery ES-P and the VCU 107 through a junction box JB provided between the high-power battery ES-P and the VCU 107. The normal charger 103 converts alternating current power from an external power source, such as a commercial power source, into direct current power at the output voltage level of the high-power battery ES-P.

The high-speed charger 105 is connected in parallel to the high-capacity battery ES-E through a junction box JB provided between the high-capacity battery ES-E and the PDU 109. The high-speed charger 105 converts alternating current power from an external power source, such as a commercial power source, into direct current power at the output voltage level of the high-capacity battery ES-E.

The VCU 107 steps up the output voltage of the high-power battery ES-P, or the voltage of the direct current power output by the normal charger 103, without converting from direct current. The VCU 107 steps down the power generated by the motor/generator 101 during deceleration of the electrically powered vehicle after conversion to direct current. The VCU 107 steps down the voltage of the output voltage of the high-capacity battery ES-E, or the direct current power output by the high-speed charger 105, without converting from direct current. The power stepped down by the VCU 107 is charged to the high-power battery ES-P.

The PDU 109 converts direct current voltage into alternating current voltage, and supplies three phase current to the motor/generator 101. The PDU 109 converts the alternating current voltage input during the regeneration operation by the motor/generator 101 into direct current voltage.

The V1 sensor 111 detects the voltage V1 of the high-power battery ES-P. A signal indicating the voltage V1 detected by the V1 sensor 111 is dispatched to the ECU 117. The V2 sensor 113 detects the voltage V2 of the high-capacity battery ES-E. The voltage V2 detected by the V2 sensor 113 is equivalent to the value of the voltage V1 of the high-power battery ES-P after being stepped up by the VCU 107. A signal indicating the voltage V2 detected by the V2 sensor 113 is dispatched to the ECU 117.

The switch group 115 includes a switch SWe that connects or interrupts a current path from the normal charger 103, the PDU 109, or the high-speed charger 105 to the high-capacity battery ES-E, and a switch SWp that connects or interrupts a current path from the normal charger 103, the PDU 109, or the high-speed charger 105 to the high-power battery ES-P, that are provided inside the junction boxes JB. Opening and closing of each of the switches SWe, SWp is controlled by the ECU 117.

The ECU 117 controls the PDU 109, the VCU 107, the normal charger 103, and the high-speed charger 105, and controls opening and closing of the switch group 115. The ECU 117 derives and manages the respective amount of energy stored (also referred to as the state of charge (SOC), or the "remaining capacity") of the high-capacity battery ES-E and the high-power battery ES-P by a current integration method and/or an open circuit voltage (OCV) estimation method.

Next, explanation follows regarding charging differences between the high-capacity battery ES-E and the high-power battery ES-P.

The properties of the high-capacity battery ES-E and the properties of the high power-battery ES-P are different from each other. The high-capacity battery ES-E has a lower power weight density, but a higher energy weight density, than the high power-battery ES-P. The high-power battery ES-P has a lower energy weight density, but a higher power weight density, than the high-capacity battery ES-E. Accordingly, the high-capacity battery ES-E is relatively superior from the perspective of energy weight density, and the high-power battery ES-P is relatively superior from the perspective of power weight density. The energy weight density is the quantity of electrical energy per unit weight (Wh/kg), and the power weight density is the power output per unit weight (W/kg).

The high-capacity battery ES-E, which has superior energy weight density, is an energy storage that prioritizes high capacity, and constantly supplies a fixed power to the motor/generator 101 during travelling of the electrically powered vehicle. The target value of the SOC of the high-capacity battery ES-E is therefore set low, and the SOC of the high-capacity battery ES-E is continuously lowered while travelling until reaching the target value. However, the high-power battery ES-P, which has excellent power weight density, is an energy storage that prioritizes high output, and supplies power to the motor/generator 101 when a large motive power is required for causing the electrically powered vehicle to travel. The regenerated power generated by the motor/generator 101 is input to the high-power battery ES-P with priority. The target value of the SOC of the high-power battery ES-P is therefore set to an intermediate value higher than the target value of the SOC of the high-capacity battery ES-E, and the SOC of the high-power battery ES-P is varied in the vicinity of the target value so as to maintain the target value. Note that although the regenerated power generated by the motor/generator 101 is input to the SOC of the high-power battery ES-P with priority as described above, a portion that cannot be used to charge the high-power battery ES-P may be used to charge the high-capacity battery ES-E.

The differences explained above between the properties of the high-capacity battery ES-E and the high-power battery ES-P are caused, for example, by various parameters determined by the structure, materials, and the like of configuration elements of the battery, such as the electrodes, active substances, and electrolytes/solutions. For example, the energy storage capacity, this being a parameter indicating the total amount of chargeable and dischargeable electricity, of the high-capacity battery ES-E is superior to that of the high-power battery ES-P. However, a C rate characteristic, this being a parameter indicating the ability to withstand deterioration of the energy storage capacity with respect to charging and discharging, of the high-power battery ES-P is superior to that of the high-capacity battery ES-E. The internal resistance value (impedance), which is a parameter indicating the electrical resistance to charging and discharging, is higher in the high-capacity battery ES-E than in the high-power battery ES-P. The charging receptivity of the high-capacity battery ES-E is therefore inferior.

Figure 2:
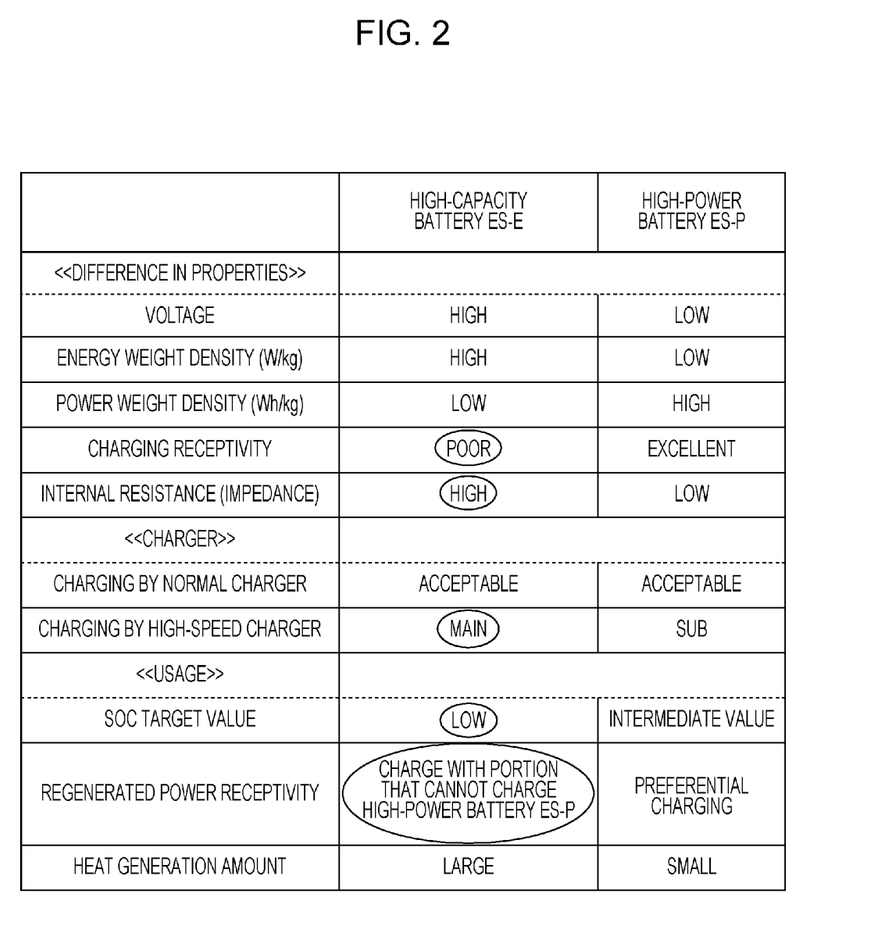
FIG. 2 is a diagram illustrating a table of differences in properties between a high-capacity battery and a high-power battery.

Thus, the high-capacity battery ES-E and the high-power battery ES-P have different properties from each other, and the difference between the properties causes a difference between the amounts of heat produced from each battery. FIG. 2 is a table of differences between properties and the like of the high-capacity battery ES-E and the high-power battery ES-P. As illustrated in FIG. 2, the voltages, energy to weight densities, output to weight densities, charging receptivity properties, internal resistances, charger primarily used when charging using an external power source, target values of the SOCs, and basic receptivity to regenerated power are different between the high-capacity battery ES-E and the high-power battery ES-P, and these differences have a large influence on the amount of heat produced. In particular, the properties and the like enclosed by circles in FIG. 2 cause the amount of heat produced by the high-capacity battery ES-E to increase compared to the high-power battery ES-P. The amount of produced heat of the high-capacity battery ES-E is therefore greater than that of the high-power battery ES-P.

As described above, although the properties of the high-capacity battery ES-E are different from the properties the high-power battery ES-P, maximum management temperatures of the respective batteries managed by the ECU 117 are similar. The maximum management temperature is a maximum temperature when the battery is used, and the ECU 117 limits charging and discharging of batteries that have exceeded the maximum management temperature. Although the amount of heat produced by the VCU 107 is greater than that of the high-capacity battery ES-E, the maximum management temperature is also set higher than the respective maximum management temperatures of the high-capacity battery ES-E and the high-power battery ES-P.

Figure 3:
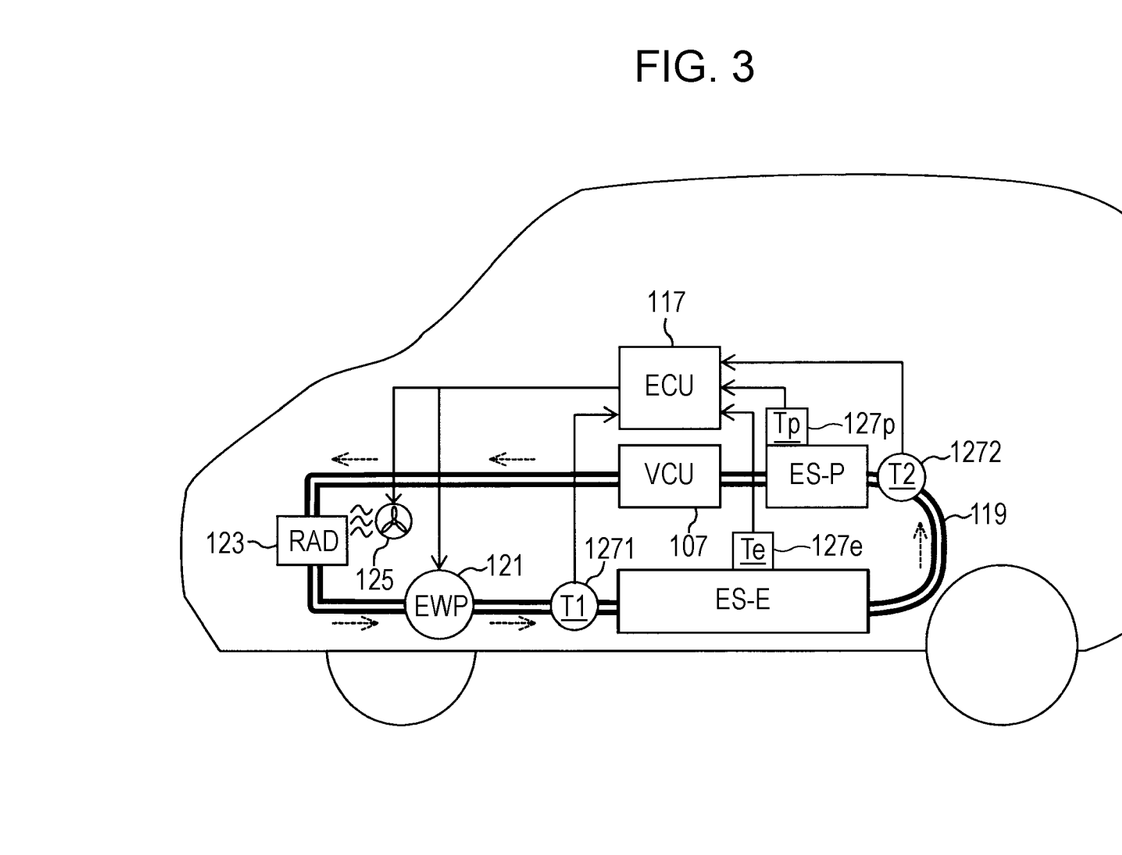
FIG. 3 is a diagram illustrating a relationship between flow of coolant liquid and positions of a high-capacity battery, a high-power battery, and a VCU in an electrically powered vehicle of the first embodiment.

Next, explanation follows regarding arrangement and respective cooling of the high-capacity battery ES-E, the high-power battery ES-P, and the VCU 107 inside the electrically powered vehicle. FIG. 3 is a diagram illustrating the relationship between the flow of the coolant liquid and the positions of the high-capacity battery ES-E, the high-power battery ES-P, and the VCU 107 in the electrically powered vehicle. As illustrated in FIG. 3, the high-capacity battery ES-E, the high-power battery ES-P, and the VCU 107 illustrated in FIG. 1 are arranged in the electrically powered vehicle such that the high-capacity battery ES-E, the high-power battery ES-P, and the VCU 107 are cooled in this sequence by the coolant liquid, which serves as a coolant. Namely, a circulation pathway 119 is formed joining the high-capacity battery ES-E, the high-power battery ES-P, and the VCU 107 together in a circuit shape using pipe pathways, and the coolant liquid inside the circulation pathway 119 flows in the direction indicated by the dashed arrows in FIG. 3.

As illustrated in FIG. 3, an electric water pump (EWP) 121, a radiator (RAD) 123 provided above the circulation pathway 119, a radiator fan 125, temperature sensors 1271, 127e, 1272, 127p, and the ECU 117 illustrated in FIG. 1 are provided inside the electrically powered vehicle, in addition to the high-capacity battery ES-E, the high-power battery ES-P, and the VCU 107. The electric water pump 121 generates pressure for circulating the coolant liquid through the circulation pathway 119. The radiator 123 cools the coolant liquid circulating through the circulation pathway 119 using an intake of air at the vehicle front side. The radiator fan 125 further cools the coolant liquid passing through the radiator 123 using airflow.

The temperature sensor 1271 detects a temperature T1 of the coolant liquid prior to cooling the high-capacity battery ES-E. A signal indicating the temperature T1 detected by the temperature sensor 1271 is sent to the ECU 117. The temperature sensor 127e detects a temperature Te of the high-capacity battery ES-E. A signal indicating the temperature Te detected by the temperature sensor 127e is sent to the ECU 117. The temperature sensor 1272 detects a temperature T2 of the coolant liquid prior to cooling the high-power battery ES-P but after having cooled the high-capacity battery ES-E. A signal indicating the temperature T2 detected by the temperature sensor 1272 is sent to the ECU 117. The temperature sensor 127p detects a temperature Tp of the high- power battery ES-P. A signal indicating the temperature Tp detected by the temperature sensor 127p is sent to the ECU 117.

Figure 4:
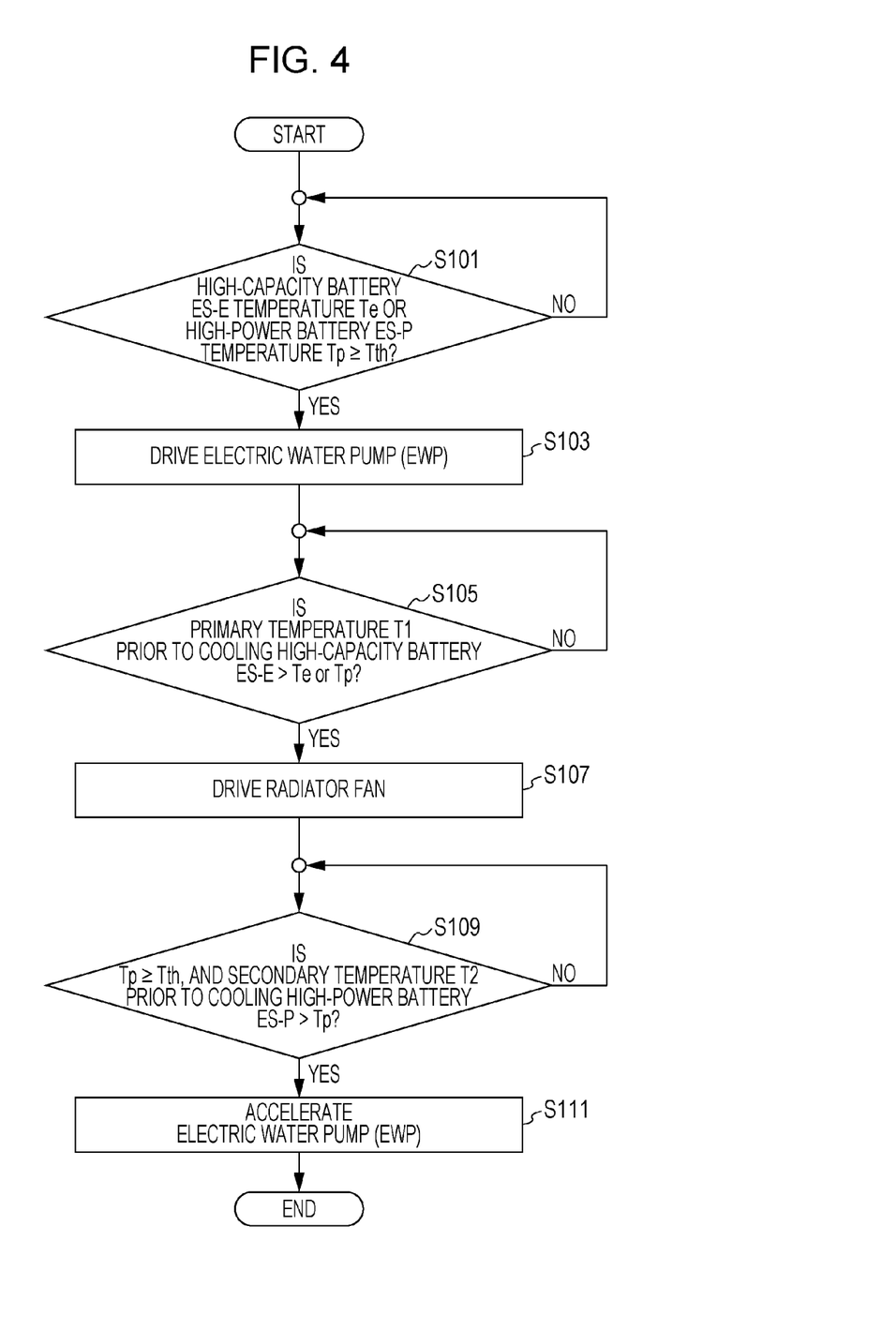
FIG. 4 is a flowchart illustrating a flow of cooling processing performed by an ECU.

The ECU 117 regulates the amount of supplied coolant liquid circulating through the circulation pathway 119 by controlling driving of the electric water pump 121 based on the temperatures detected by the temperature sensors 127e, 1272, 127p. The ECU 117 also regulates the temperature of the coolant liquid circulating through the circulation pathway 119 by controlling driving of the radiator fan 125 based on the temperatures detected by the temperature sensors 1271, 127e, 127p. Explanation follows regarding details of control of the electric water pump 121 and the radiator fan 125 performed by the ECU 117, with reference to FIG. 4. FIG. 4 is a flowchart illustrating a flow of cooling processing performed by the ECU 117.

As illustrated in FIG. 4, the ECU 117 determines whether at least one out of the temperature Te of the high-capacity battery ES-E detected by the temperature sensor 127e or the temperature Tp of the high-power battery ES-P detected by the temperature sensor 127p is a threshold value Tth or higher (whether Te or Tp≥Tth) (step S101), and processing proceeds to step S103 if Te or Tp≥Tth, or processing returns to step S101 if Te and Tp≤Tth. At step S103, the ECU 117 performs control to drive the electric water pump 121. Note that the maximum management temperature of the high-capacity battery ES-E and the high-power battery ES-P, or a temperature in the vicinity thereof, is set as the threshold value Tth.

Next, the ECU 117 determines whether the temperature (primary temperature) T1 of the coolant liquid prior to cooling the high-capacity battery ES-E is higher than the lowest temperature out of the temperature Te of the high-capacity battery ES-E or the temperature Tp of the high-power battery ES-P (T1>Te or Tp) (step S105). Processing proceeds to step S107 if T1>Te or Tp, or processing returns to step S105 if T1≤Te and Tp. At step S107, the ECU 117 performs control to drive the radiator fan 125.

Next, the ECU 117 determines whether the temperature Tp of the high-power battery ES-P is the threshold value Tth or above (Tp≥Tth) and whether the temperature (secondary temperature) T2 of the coolant liquid prior to cooling the high-power battery ES-P but after having cooled the high-capacity battery ES-E is higher than the temperature Tp of the high-power battery ES-P (T2>Tp) (step S109). Processing proceeds to step S111 if Tp≥Tth and T2>Tp, or processing returns to step S109 if Tp<Tth or T2≤Tp. At step S111, the ECU 117 accelerates the electric water pump 121 and performs control to increase the supplied amount of coolant liquid circulating through the circulation pathway 119 per unit of time.

As explained above, according to the present embodiment, in order to cool with priority from the high-capacity battery ES-E, which produces a large amount of heat, the high-capacity battery ES-E is sufficiently cooled, and the high-power battery ES-P disposed at the downstream side is cooled by the coolant liquid that has been heated by the heat of the high-capacity battery ES-E, but is still sufficiently cooled due to only producing a small amount of heat. A system provided with plural batteries producing different amounts of heat can thus be cooled using an ideal mode. Note that although the maximum management temperatures of the high-capacity battery ES-E and the high-power battery ES-P are similar to each other, the high-capacity battery ES-E and the high-power battery ES-P are both maintained at appropriate temperatures due to being cooled in a well-balanced manner, enabling the possibility of one of the batteries reaching the maximum management temperature alone to be decreased.

Moreover, the VCU 107 produces a greater amount of heat than the high-capacity battery ES-E and the high-power battery ES-P, but also has a higher maximum management temperature, and the VCU 107 can therefore be cooled such that the VCU 107 does not reach its maximum management temperature despite prioritizing cooling of the high-capacity battery ES-E and the high-power battery ES-P. Note that the VCU 107 is disposed in the vicinity of the high-capacity battery ES-E or the high-power battery ES-P, enabling efficient collective cooling of the VCU 107 in addition to the two batteries.

The high-capacity battery ES-E has high internal resistance and produces a great amount of heat, but cooling is performed with priority from the high-capacity battery ES-E, enabling a system provided with plural batteries having different internal resistances to be cooled using an ideal mode. Moreover, although the high-capacity battery ES-E is generally used (discharged) more frequently and produces more heat than the high-power battery ES-P due to having a high energy weight density and a low power weight density, cooling is performed with priority from the high-capacity battery ES-E, enabling a system provided with plural batteries having different properties to be cooled using an ideal mode. Since the target value of the SOC of the high-capacity battery ES-E is low, the high-capacity battery ES-E is continuously discharged until the SOC thereof falls to this low target value. Although the amount of heat produced by the high-capacity battery ES-E is great as a result, cooling is performed with priority from the high-capacity battery ES-E, enabling a system provided with plural batteries producing different amounts of heat due to differences in target values of the SOC to be cooled using an ideal mode that takes into consideration the differences in how the respective batteries are used. Moreover, although the portion of the regenerated power that cannot charge the high-power battery ES-P is charged to the high-capacity battery ES-E, the high-capacity battery ES-E produces a great amount of heat due to having higher internal resistance and inferior charging receptivity properties. However, since cooling is performed with priority from the high-capacity battery ES-E, a system provided with plural batteries having different charging receptivity properties can be cooled using an ideal mode that takes into consideration the differences in how the respective batteries are used. Moreover, the high-speed charger 105 charges the high-capacity battery ES-E at high voltage, and high voltage charging of that battery entails great heat emission. However, since cooling is performed with priority from the high-capacity battery ES-E, a system provided with plural batteries that produce different amounts of heat during charging can be cooled using an ideal mode.

As illustrated in the flowchart of FIG. 4, the temperature of the coolant liquid is managed based on the temperature T1 prior to cooling the high-capacity battery ES-E, and the supplied amount of coolant liquid circulating through the circulation pathway 119 is regulated based on the relationship between the temperature T2 of the coolant liquid prior to cooling the high-power battery ES-P and the temperature Tp of the high-power battery ES-P. Thus, even when the temperature Tp of the high-power battery ES-P rises, the high-power battery ES-P can be suitably cooled by changing the temperature and supplied amount of the coolant liquid. In particular, although the high-power battery ES-P may be heated by the coolant liquid when the temperature T2 of the coolant liquid prior to cooling the high-power battery ES-P is higher than the temperature Tp of the high-power battery ES-P, which itself is higher than the threshold value Tth (a value corresponding to the maximum management temperature of the high-capacity battery ES-E and the high-power battery ES-P, or a value in the vicinity thereof), the temperature T2 of the coolant liquid prior to cooling the high-power battery ES-P can be lowered by accelerating the electric water pump 121 to increase the supplied amount of coolant liquid, and lowering the amount of heat that a unit of volume of the coolant liquid conducts from the high-capacity battery ES-E. This enables the high-power battery ES-P, which has a temperature higher than the threshold value Tth, to be cooled by the coolant liquid.

The present disclosure is not limited by the embodiment described above, and appropriate modifications, improvements, or the like may be made. For example, although the electrically powered vehicle in the above explanation is a single motor electrical vehicle (EV), the electrically powered vehicle may be an EV provided with plural motor/generators, a hybrid electrical vehicle (HEV) provided with at least one motor/generator and an internal combustion engine, or a plug-in hybrid electrical vehicle (PHEV). Moreover, the coolant explained as a coolant liquid as an example may be a gas.

Although the high-capacity battery ES-E, the high-power battery ES-P, and the VCU 107 are subject to cooling by the coolant liquid in the above explanation, two electronic components producing different amounts of heat but having similar maximum management temperatures may be cooled instead of the high-capacity battery ES-E and the high-power battery ES-P. In such cases, since cooling is performed with priority from the first electronic component, which produces a great amount of heat, the first electronic component is sufficiently cooled, and the second electronic component disposed at the downstream side is cooled by coolant liquid that has been heated by the heat of the first electronic component, but is still sufficiently cooled due to the amount of produced heat being low. Thus, a system provided with plural electronic components producing different amounts of heat can be cooled using an ideal mode.

Figure 5:
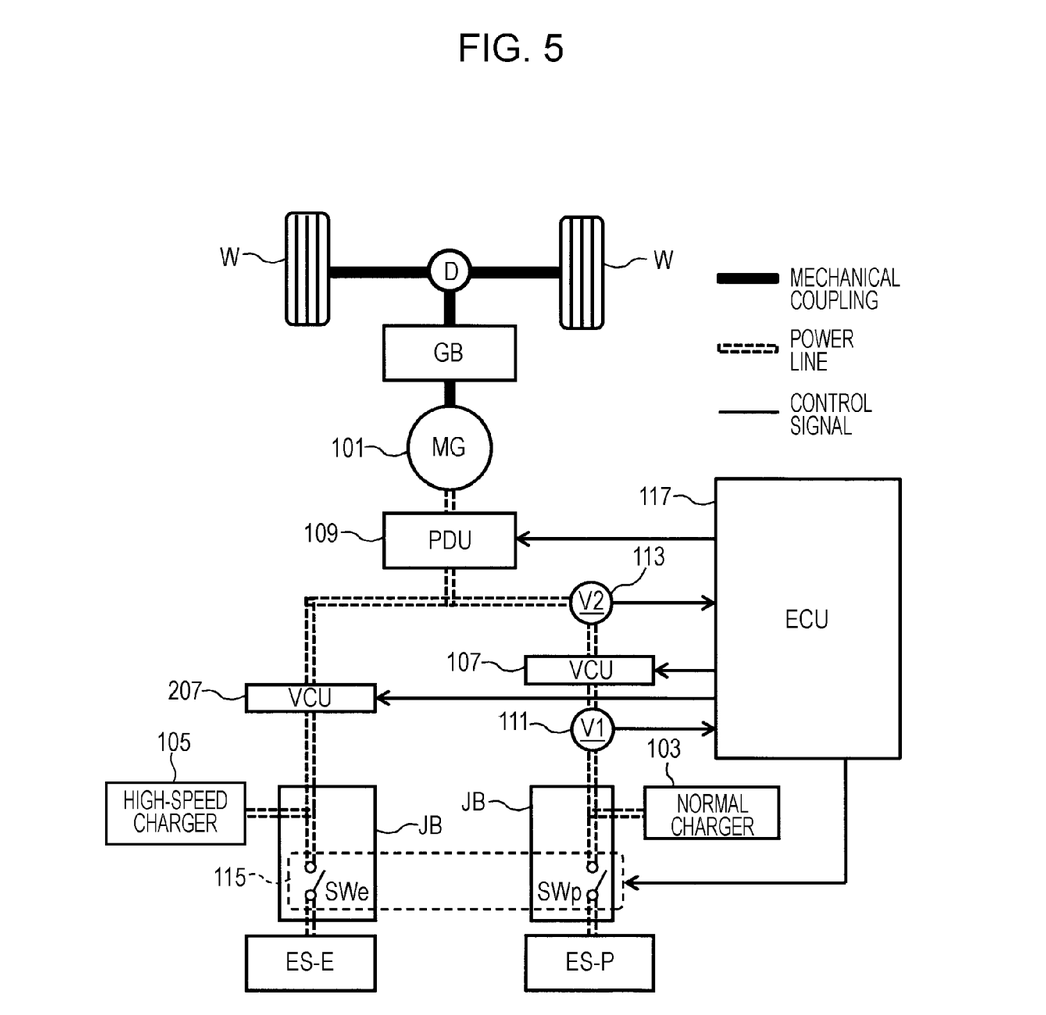
FIG. 5 is a block diagram illustrating an internal configuration of an electrically powered vehicle of another embodiment.
Figure 6:
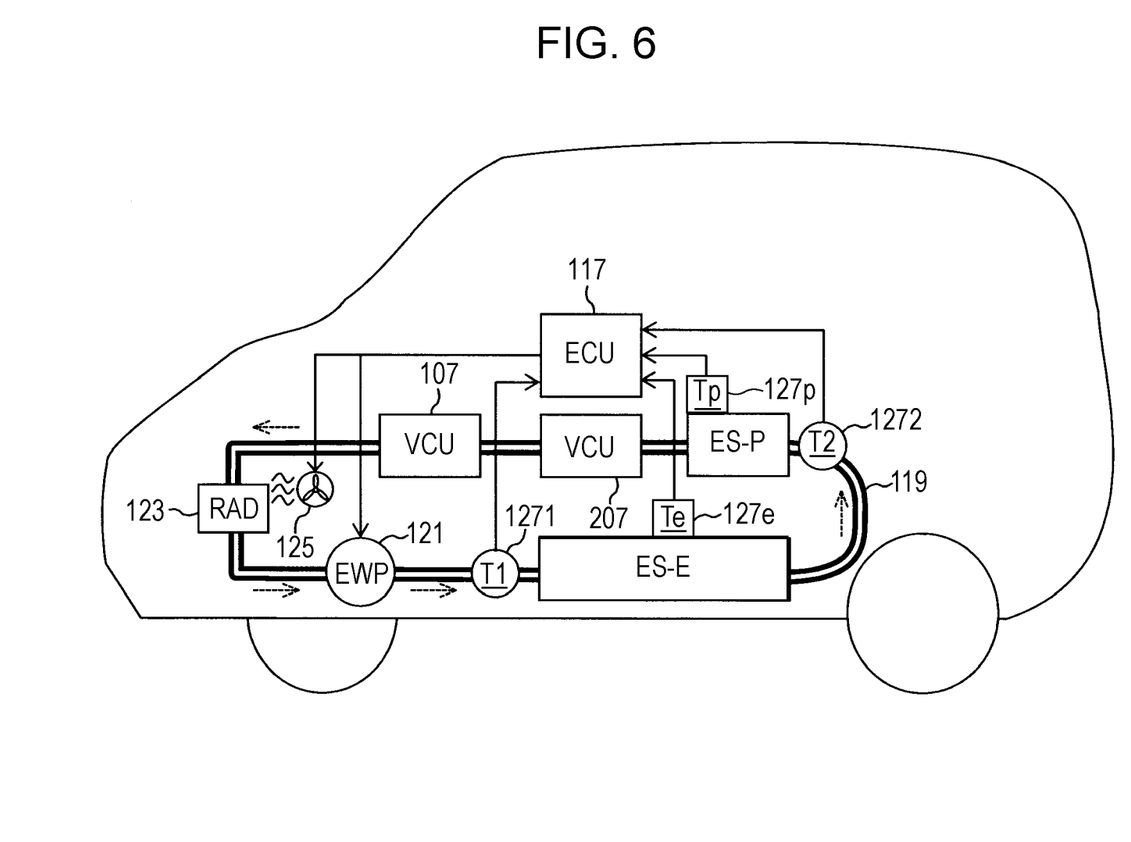
FIG. 6 is a diagram illustrating a relationship between flow of coolant liquid and positions of a high-capacity battery, a high-power battery, and a VCU in an electrically powered vehicle of another embodiment.

Moreover, as illustrated in FIG. 5, a VCU 207 may also be provided at the high-capacity battery ES-E side. Providing two VCUs increases efficiency since a voltage applied to a motor/generator 11 and a PDU 13 is restricted by the high-capacity battery ES-E. However, excellent cooling performance is demanded since two VCUs are provided. Moreover, as described above, the high-capacity battery ES-E is generally used (discharged) more frequently than the high-power battery ES-P, and the VCU of the high-capacity battery ES-E is therefore also operated more frequently than the VCU 107 of the high-power battery ES-P. Thus, as illustrated in FIG. 6, the VCU 207 of the high-capacity battery ES-E is provided further at the upstream side than the VCU 107 of the high-power battery ES-P.

A first aspect of the present disclosure describes a drive system including a first energy storage (for example, the high-capacity battery ES-E in an embodiment described below), a second energy storage (for example, the high-power battery ES-P in the embodiment described below) that produces a smaller amount of heat due to charging and discharging than the first energy storage, a drive section (for example, the motor/generator 101 in the embodiment described below) that is driven by power obtained from at least one of the first energy storage and the second energy storage so as to output motive power for an electrically powered vehicle, and a controller (for example, the ECU 117 in the embodiment described below) that controls temperatures of the first energy storage and the second energy storage using a coolant flowing inside the electrically powered vehicle, the first energy storage and the second energy storage being disposed inside the electrically powered vehicle such that the first energy storage and the second energy storage are cooled by the coolant in this sequence.

In a second aspect of the present disclosure, the first aspect of the present disclosure may be configured such that a maximum management temperature of the first energy storage and a maximum management temperature of the second energy storage, managed by the controller, are substantially the same as each other.

In a third aspect of the present disclosure, the first or second aspect of the present disclosure may further include an electrical section that includes a voltage transformer (for example, the VCU 107 of the embodiment described below) that transforms an output voltage of the first energy storage or the second energy storage; the first energy storage, the second energy storage, and the electrical section being disposed inside the electrically powered vehicle such that the first energy storage, the second energy storage, and the electrical section are cooled by the coolant in this sequence.

In a fourth aspect of the present disclosure, any aspect out of the first to the third aspect of the present disclosure may be configured such that the first energy storage has high internal resistance compared to the second energy storage.

In a fifth aspect of the present disclosure, the fourth aspect of the present disclosure may be configured such that the first energy storage is superior to the second energy storage in energy weight density and inferior to the second energy storage in power weight density.

In a sixth aspect of the present disclosure, the fourth or the fifth aspect of the present disclosure may further include a first management section (for example, the ECU 117 of the embodiment described below) that manages the amounts of stored energy of the first energy storage and the second energy storage, wherein the first management section controls charging and discharging of the first energy storage and the second energy storage based on respective target values for the amounts of stored energy of the first energy storage and the second energy storage, and a target value for the amount of stored energy of the first energy storage is lower than a target value for the amount of stored energy of the second energy storage.

In a seventh aspect of the present disclosure, any aspect out of the fourth to the sixth aspect of the present disclosure, may be configured further including a second management section (for example, the ECU 117 of the embodiment described below) that manages the amounts of stored energy of the first energy storage and the second energy storage, wherein the second management section controls charging of the first energy storage and the second energy storage such that regenerated power obtained by a regeneration operation of the drive section is charged to the second energy storage with priority over the first energy storage, and a portion of the regenerated power that cannot charge the second energy storage is charged to the first energy storage.

In an eighth aspect of the present disclosure, any aspect out of the third to the seventh aspect of the present disclosure may be configured such that the voltage transformer transforms the output voltage of the second energy storage, the drive system further including a first charger (for example, the normal charger 103 of the embodiment described below) that transforms power supplied from an external power source, and that directly charges the second energy storage with the transformed power, and a second charger (for example, the high-speed charger 105 of the embodiment described below) that transforms power supplied from the external power source, and that directly charges the first energy storage with the transformed power, at a higher voltage than that of the first charger.

In a ninth aspect of the present disclosure, any aspect out of the first to the eighth aspect of the present disclosure may further include a temperature regulator (for example, the radiator fan 125 of the embodiment described below) that regulates a temperature of the coolant, and a supply amount regulator (for example, the electric water pump 121 of the embodiment described below) that regulates a supplied amount of the coolant. Moreover, configuration may be made such that in cases in which a primary temperature that is a temperature of the coolant prior to cooling the first energy storage is higher than at least one of the temperature of the first energy storage and the temperature of the second energy storage, the controller drives the temperature regulator to lower the temperature of the coolant, and then determines whether or not to increase the supplied amount of coolant using the supply amount regulator based on a secondary temperature that is a temperature of the coolant after having cooled the first energy storage but prior to cooling the second energy storage, and based on the temperature of the second energy storage.

In a tenth aspect of the present disclosure, the ninth aspect of the present disclosure may be configured such that, when determining whether or not to increase the supplied amount of the coolant, the controller controls the supply amount regulator such that the supplied amount of coolant increases in cases in which the secondary temperature is higher than the temperature of the second energy storage.

In an eleventh aspect of the present disclosure, the ninth aspect of the present disclosure may be configured such that, when determining whether or not to increase the supplied amount of the coolant, the controller controls the supply amount regulator such that the supplied amount of the coolant increases in cases in which the temperature of the second energy storage is higher than a threshold value and the secondary temperature is higher than the temperature of the second energy storage.

A twelfth aspect of the present disclosure describes a transporter including the drive system of any aspect out of the first to the eleventh aspect of the present disclosure.

A thirteenth aspect of the present disclosure describes an electrical device including a first electrical section (for example, the high-capacity battery ES-E of the embodiment described below) of an electrically powered vehicle, a second electrical section (for example, the high-power battery ES-P of the embodiment described below) of the electrically powered vehicle, which produces a smaller amount of heat than the first electrical section, and a controller (for example, the ECU 117 of the embodiment described below) that controls temperatures of the first electrical section and the second electrical section using a coolant flowing inside the electrically powered vehicle, the first electrical section and the second electrical section being disposed inside the electrically powered vehicle such that the first electrical section and the second electrical section are cooled by the coolant in this sequence.

A fourteenth aspect of the present disclosure describes a control method for a drive system including a first energy storage (for example, the high-capacity battery ES-E of the embodiment described below), a second energy storage (for example, the high-power battery ES-P of the embodiment described below) that produces a smaller amount of heat due to charging and discharging than the first energy storage, a drive section (for example, the motor/generator 101 of the embodiment described below) that is driven by power obtained from at least one of the first energy storage and the second energy storage so as to output motive power for an electrically powered vehicle, a controller (for example, the ECU 117 of the embodiment described below) that controls temperatures of the first energy storage and the second energy storage using a coolant flowing inside the electrically powered vehicle, a temperature regulator (for example, the radiator fan 125 of the embodiment described below) that regulates a temperature of the coolant, and a supply amount regulator (for example, the electric water pump 121 of the embodiment described below) that regulates a supplied amount of the coolant, the first energy storage and the second energy storage being disposed inside the electrically powered vehicle such that the first energy storage and the second energy storage are cooled by the coolant in this sequence. The control method includes, in cases in which a primary temperature that is a temperature of the coolant prior to cooling the first energy storage is higher than at least one of the temperature of the first energy storage and the temperature of the second energy storage, the controller driving the temperature regulator to lower the temperature of the coolant, and then determining whether or not to increase the supplied amount of coolant using the supply amount regulator based on a secondary temperature that is a temperature of the coolant after having cooled the first energy storage but prior to cooling the second energy storage, and based on the temperature of the second energy storage.

According to the first aspect of the present disclosure and the twelfth aspect of the present disclosure, since cooling is performed with priority from the first energy storage, which produces a great amount of heat, the first energy storage is sufficiently cooled, and the second energy storage disposed at the downstream side is cooled by the coolant that has been heated by the heat of the first energy storage, but is still sufficiently cooled due to only producing a small amount of heat. Thus, a system provided with plural energy storages producing different amounts of heat can be cooled using an ideal mode.

According to the second aspect of the present disclosure, although the maximum management temperatures of the first energy storage and the second energy storage are substantially the same as each other, the first energy storage and the second energy storage are both maintained at appropriate temperatures due to being cooled in a well-balanced manner, enabling the possibility of one of the energy storage reaching the maximum management temperature alone to be decreased.

According to the third aspect of the present disclosure, the voltage transformer produces a greater amount of heat than the first energy storage and the second energy storage, but also has a higher maximum management temperature, and the voltage transformer can therefore be cooled such that the voltage transformer does not reach its maximum management temperature despite prioritizing cooling of the first energy storage and the second energy storage. Note that a cooling circuit of the energy storages can also be used for efficient collective cooling of the voltage transformer when the voltage transformer is disposed in the vicinity of the first energy storage or the second energy storage.

According to the fourth aspect of the present disclosure, energy storages having high internal resistance produce a great amount of heat, but cooling is performed with priority from the first energy storage, which has high internal resistance, enabling a system provided with plural energy storages having different internal resistances to be cooled using an ideal mode.

According to the fifth aspect of the present disclosure, although the high capacity energy storage, which has high energy weight density and low power weight density, is generally used (discharged) frequently and produces a great amount of heat compared to the second energy storage, cooling is performed with priority from the first energy storage, which has high capacity, enabling a system provided with plural energy storages having different properties to be cooled using an ideal mode.

According to the sixth aspect of the present disclosure, since the target value for the amount of stored energy of the first energy storage is low, the first energy storage can continuously discharge until the amount of stored energy thereof falls to the low target value. As a result, the first energy storage produces a great amount of heat but cooling is performed with priority from the first energy storage, enabling cooling of a system provided with plural energy storages producing different amounts of heat due to differences in target values of amount of stored energy to be performed using an ideal mode that takes into consideration differences in how the respective energy storages are used.

According to the seventh aspect of the present disclosure, the portion of regenerated power that cannot charge the second energy storage charges the first energy storage, and the first energy storage produces a great amount of heat due to having high internal resistance and inferior charging receptivity. However, since cooling is performed with priority from the first energy storage, a system provided with plural energy storages having different charging receptivities can be cooled using an ideal mode that takes into consideration the differences in how the respective energy storages are used.

According to the eighth aspect of the present disclosure, the second charger charges the first energy storage at a high voltage, and charging of that energy storage at a high voltage entails a great heat emission. However, since cooling is performed with priority from the first energy storage, a system provided with plural energy storages that produce different amounts of heat during charge can be cooled using an ideal mode.

According to the ninth aspect of the present disclosure and the fourteenth aspects of the present disclosure, the temperature of the coolant is managed based on the temperature prior to cooling the first energy storage, and the supplied amount of the coolant is regulated based on the relationship between the temperature of the coolant prior to cooling the second energy storage and the temperature of the second energy storage. Thus, even when the temperature of the second energy storage rises, the second energy storage can be suitably cooled by changing the temperature and supplied amount of the coolant.

According to the tenth aspect of the present disclosure, although the second energy storage is heated by the coolant when the temperature of the coolant prior to cooling the second energy storage is higher than the temperature of the second energy storage, the temperature of the coolant prior to cooling the second energy storage can be lowered by increasing the supplied amount of the coolant and lowering the amount of heat that a unit volume of the coolant conducts from the first energy storage. Thus, the second energy storage can be cooled by the coolant.

According to the eleventh aspect of the present disclosure, when the temperature of the coolant prior to cooling the second energy storage is higher than the temperature of the second energy storage, which is higher than the threshold value (a value corresponding to the maximum management temperature of the first energy storage and the second energy storage or a value in the vicinity thereof), the second energy storage is heated by the coolant. However, the temperature of the coolant prior to cooling the second energy storage can be lowered by increasing the supplied amount of coolant and lowering the amount of heat that a unit volume of the coolant conducts from the first energy storage. Thus, the second energy storage, having a temperature higher than the threshold value, can be cooled by the coolant.

According to the thirteenth aspect of the present disclosure, since cooling is performed with priority from the first electrical section, which produces a great amount of heat, the first electrical section is sufficiently cooled, and the second electrical section disposed at the downstream side is cooled by the coolant that has been heated by the heat of the first electrical section device, but is still sufficiently cooled due to only producing a small amount of heat. Thus, a system provided with plural electrical sections producing different amounts of heat can be cooled using an ideal mode.

Obviously, numerous modifications and variations of the present invention are possible in light of the above teachings. It is therefore to be understood that within the scope of the appended claims, the invention may be practiced otherwise than as specifically described herein.

What is claimed is:

1. A drive system comprising:
   a first energy storage;
   a second energy storage that produces a smaller amount of heat due to charging and discharging than the first energy storage;
   a drive section that is driven by power obtained from at least one of the first energy storage and the second energy storage so as to output motive power for an electrically powered vehicle; and
   a controller that controls temperatures of the first energy storage and the second energy storage using a coolant flowing inside the electrically powered vehicle,
   the first energy storage and the second energy storage being disposed inside the electrically powered vehicle such that the first energy storage and the second energy storage are cooled by the coolant in this sequence.

2. The drive system according to claim 1, wherein a maximum management temperature of the first energy storage and a maximum management temperature of the second energy storage, managed by the controller, are substantially the same as each other.

3. The drive system according to claim 1, further comprising an electrical section that includes a voltage transformer that transforms an output voltage of the first energy storage or the second energy storage,
   the first energy storage, the second energy storage, and the electrical section being disposed inside the electrically powered vehicle such that the first energy storage, the second energy storage, and the electrical section are cooled by the coolant in this sequence.

4. The drive system according to claim 3, wherein the voltage transformer transforms the output voltage of the second energy storage, the drive system further comprising:
   a first charger that transforms power supplied from an external power source, and that directly charges the second energy storage with the transformed power; and
   a second charger that transforms power supplied from the external power source, and that directly charges the first energy storage with the transformed power, at a higher voltage than that of the first charger.

5. The drive system according to claim 1, wherein the first energy storage has high internal resistance compared to the second energy storage.

6. The drive system according to claim 5, wherein the first energy storage is superior to the second energy storage in energy weight density and inferior to the second energy storage in power weight density.

7. The drive system according to claim 5, further comprising a first management section that manages the amounts of stored energy of the first energy storage and the second energy storage, wherein
   the first management section controls charging and discharging of the first energy storage and the second energy storage based on respective target values for the amounts of stored energy of the first energy storage and the second energy storage, and
   a target value for the amount of stored energy of the first energy storage is lower than a target value for the amount of stored energy of the second energy storage.

8. The drive system according to claim 5, further comprising a second management section that manages the amounts of stored energy of the first energy storage and the second energy storage, wherein
   the second management section controls charging of the first energy storage and the second energy storage such that regenerated power obtained by a regeneration operation of the drive section is charged to the second energy storage with priority over the first energy storage, and a portion of the regenerated power that cannot charge the second energy storage is charged to the first energy storage.

9. The drive system according to claim 1, further comprising:
   a temperature regulator that regulates a temperature of the coolant; and
   a supply amount regulator that regulates a supplied amount of the coolant, wherein
   in cases in which a primary temperature that is a temperature of the coolant prior to cooling the first energy storage is higher than at least one of the temperature of the first energy storage and the temperature of the second energy storage, the controller drives the temperature regulator to lower the temperature of the coolant, and then determines whether or not to increase the supplied amount of coolant using the supply amount regulator based on a secondary temperature that is a temperature of the coolant after having cooled the first energy storage but prior to cooling the second energy storage, and based on the temperature of the second energy storage.

10. The drive system according to claim 9, wherein when determining whether or not to increase the supplied amount of the coolant, the controller controls the supply amount regulator such that the supplied amount of coolant increases in cases in which the secondary temperature is higher than the temperature of the second energy storage.

11. The drive system according to claim 9, wherein when determining whether or not to increase the supplied amount of the coolant, the controller controls the supply amount regulator such that the supplied amount of the coolant increases in cases in which the temperature of the second energy storage is higher than a threshold value and the secondary temperature is higher than the temperature of the second energy storage.

12. A transporter comprising the drive system according to claim 1.

13. An electrical device comprising:
   a first electrical section of an electrically powered vehicle;
   a second electrical section of the electrically powered vehicle, which produces a smaller amount of heat than the first electrical section; and
   a controller that controls temperatures of the first electrical section and the second electrical section using a coolant flowing inside the electrically powered vehicle,
   the first electrical section and the second electrical section being disposed inside the electrically powered vehicle such that the first electrical section and the second electrical section are cooled by the coolant in this sequence.

14. A control method for a drive system including a first energy storage; a second energy storage that produces a smaller amount of heat due to charging and discharging than the first energy storage; a drive section that is driven by power obtained from at least one of the first energy storage and the second energy storage so as to output motive power for an electrically powered vehicle; a controller that controls temperatures of the first energy storage and the second energy storage using a coolant flowing inside the electrically powered vehicle; a temperature regulator that regulates a temperature of the coolant; and a supply amount regulator that regulates a supplied amount of the coolant, the first energy storage and the second energy storage being disposed inside the electrically powered vehicle such that the first energy storage and the second energy storage are cooled by the coolant in this sequence, the control method comprising:

in cases in which a primary temperature that is a temperature of the coolant prior to cooling the first energy storage is higher than at least one of the temperature of the first energy storage and the temperature of the second energy storage, the controller driving the temperature regulator to lower the temperature of the coolant, and then determining whether or not to increase the supplied amount of coolant using the supply amount regulator based on a secondary temperature that is a temperature of the coolant after having cooled the first energy storage but prior to cooling the second energy storage, and based on the temperature of the second energy storage.

15. A drive system comprising:
a first energy storage to be charged and discharged, a first amount of heat being generated by charging and discharging the first energy storage;
a second energy storage to be charged and discharged, a second amount of heat being generated by charging and discharging the second energy storage and being smaller than the first amount of heat;
a driver to generate driving power to move an electrically powered vehicle with electric power supplied from at least one of the first energy storage and the second energy storage; and
a controller to control temperature of the first energy storage and temperature of the second energy storage with a coolant flowing inside the electrically powered vehicle, the first energy storage and the second energy storage being disposed inside the electrically powered vehicle such that the first energy storage is cooled by the coolant before the second energy storage is cooled by the coolant.

16. The drive system according to claim 15, wherein a maximum management temperature of the first energy storage managed by the controller is substantially the same as a maximum management temperature of the second energy storage managed by the controller.

17. The drive system according to claim 15, further comprising:
an electrical section that includes a voltage transformer that transforms an output voltage of the first energy storage or the second energy storage, wherein
the first energy storage, the second energy storage, and the electrical section being disposed inside the electrically powered vehicle such that the first energy storage, the second energy storage, and the electrical section are cooled by the coolant in this order.

18. The drive system according to claim 17, wherein the voltage transformer transforms the output voltage of the second energy storage, the drive system further comprising:
a first charger that transforms power supplied from an external power source, and that directly charges the second energy storage with the transformed power; and
a second charger that transforms power supplied from the external power source, and that directly charges the first energy storage with the transformed power, at a higher voltage than that of the first charger.

19. The drive system according to claim 15, wherein the first energy storage has high internal resistance compared to the second energy storage.

20. The drive system according to claim 19, wherein the first energy storage is superior to the second energy storage in energy weight density and inferior to the second energy storage in power weight density.

21. The drive system according to claim 19, further comprising:
a first management section that manages the amounts of stored energy of the first energy storage and the second energy storage, wherein
the first management section controls charging and discharging of the first energy storage and the second energy storage based on respective target values for the amounts of stored energy of the first energy storage and the second energy storage, and
a target value for the amount of stored energy of the first energy storage is lower than a target value for the amount of stored energy of the second energy storage.

22. The drive system according to claim 19, further comprising:
a second management section that manages the amounts of stored energy of the first energy storage and the second energy storage, wherein
the second management section controls charging of the first energy storage and the second energy storage such that regenerated power obtained by a regeneration operation of the driver is charged to the second energy storage with priority over the first energy storage, and a portion of the regenerated power that cannot charge the second energy storage is charged to the first energy storage.

23. The drive system according to claim 15, further comprising:
a temperature regulator that regulates a temperature of the coolant; and
a supply amount regulator that regulates a supplied amount of the coolant, wherein
in cases in which a primary temperature that is a temperature of the coolant prior to cooling the first energy storage is higher than at least one of the temperature of the first energy storage and the temperature of the second energy storage, the controller drives the temperature regulator to lower the temperature of the coolant, and then determines whether or not to increase the supplied amount of coolant using the supply amount regulator based on a secondary temperature that is a temperature of the coolant after having cooled the first energy storage but prior to cooling the second energy storage, and based on the temperature of the second energy storage.

24. The drive system according to claim 23, wherein
when determining whether or not to increase the supplied amount of the coolant, the controller controls the supply amount regulator such that the supplied amount of coolant increases in cases in which the secondary temperature is higher than the temperature of the second energy storage.

25. The drive system according to claim 23, wherein when determining whether or not to increase the supplied amount of the coolant, the controller controls the supply amount regulator such that the supplied amount of the coolant increases in cases in which the temperature of the second energy storage is higher than a threshold value and the secondary temperature is higher than the temperature of the second energy storage.

26. A transporter comprising the drive system according to claim 15.

27. An electrical device comprising:
a first electrical component of an electrically powered vehicle, a first amount of heat being generated from the first electrical component;
a second electrical component of the electrically powered vehicle, a second amount of heat being generated from the second electrical component and being smaller than the first amount of heat; and
a controller to control temperature of the first electrical component and temperature of the second electrical component with a coolant flowing inside the electrically powered vehicle, the first electrical component and the second electrical component being disposed inside the electrically powered vehicle such that the first electrical component is cooled by the coolant before the second electrical component is cooled by the coolant.

28. A control method for a drive system, comprising:
controlling temperature of a first energy storage and temperature of a second energy storage with a coolant flowing inside an electrically powered vehicle, a first amount of heat being generated by charging and discharging the first energy storage, a second amount of heat being generated by charging and discharging the second energy storage and being smaller than the first amount of heat, the first energy storage and the second energy storage being disposed inside the electrically powered vehicle such that the first energy storage is cooled by the coolant before the second energy storage is cooled by the coolant;
determining whether or not a primary temperature of a coolant prior to cooling a first energy storage is higher than at least one temperature of the first energy storage and temperature of the second energy storage;
lowing temperature of the coolant in a case where the primary temperature is higher than the at least one temperature; and
determining whether or not to increase a supply amount of coolant based on the temperature of the second energy storage and a secondary temperature of the coolant that has cooled the first energy storage and has not cooled the second energy.

* * * * *